United States Patent [19]

Nieto et al.

[11] Patent Number: 5,579,248
[45] Date of Patent: Nov. 26, 1996

[54] METHOD FOR REMOVING BOREHOLE RUGOSITY NOISE FROM WELL LOG DATA

[75] Inventors: John A. Nieto, Carrollton; Denis P. Schmitt, Richardson; Robert G. Keys, Dallas; Keh Pann, Richardson, all of Tex.

[73] Assignee: Mobil Oil Corporation, Fairfax, Va.

[21] Appl. No.: 369,965

[22] Filed: Jan. 9, 1995

[51] Int. Cl.$^6$ ................................. G01V 1/36; G01V 1/40
[52] U.S. Cl. ..................... 364/574; 73/152.02; 364/422; 367/38
[58] Field of Search ................................... 364/574, 572, 364/724.01, 421, 422; 73/151, 152; 324/76.28, 76.29; 367/38, 43, 47, 45

[56] References Cited

U.S. PATENT DOCUMENTS

| | | | |
|---|---|---|---|
| 4,350,887 | 9/1982 | Barnard et al. | 250/265 |
| 4,809,236 | 2/1989 | Hsu et al. | 367/28 |
| 4,853,903 | 8/1989 | Linville, Jr. et al. | 364/421 X |
| 5,010,526 | 4/1991 | Linville, Jr. et al. | 364/421 X |

Primary Examiner—Emanuel T. Voeltz
Assistant Examiner—Edward Pipala
Attorney, Agent, or Firm—Ronald A. Bleeker; Malcolm D. Keen

[57] ABSTRACT

A method for eliminating sinusoidal noise without affecting the response of the formation means that the actual formation responses of the logging tools are recovered, and the logs can be used quantitatively. Removal of sinusoidal noise from a log is accomplished in three steps. First, the log is reduced to a zero-mean, stationary series. Second, the wavenumber of the sinusoidal noise is identified by its peak in the Fourier amplitude spectrum. And third, the noise is removed by applying a zero-phase notch filter. In order to preserve the quantitative data integrity, the low wavenumber trend is kept. Preserving the quantitative data integrity is accomplished by approximating the log with a least-squares cubic spline which retains the overall log character, ignoring the sinusoidal noise. A zero mean stationary series is formed by subtracting the least-squares cubic spline from the data. The remaining steps, Fourier analysis and filtering are performed on the difference series. Recombining the filtered series with the spline restores the log data without the sinusoidal noise.

17 Claims, 5 Drawing Sheets

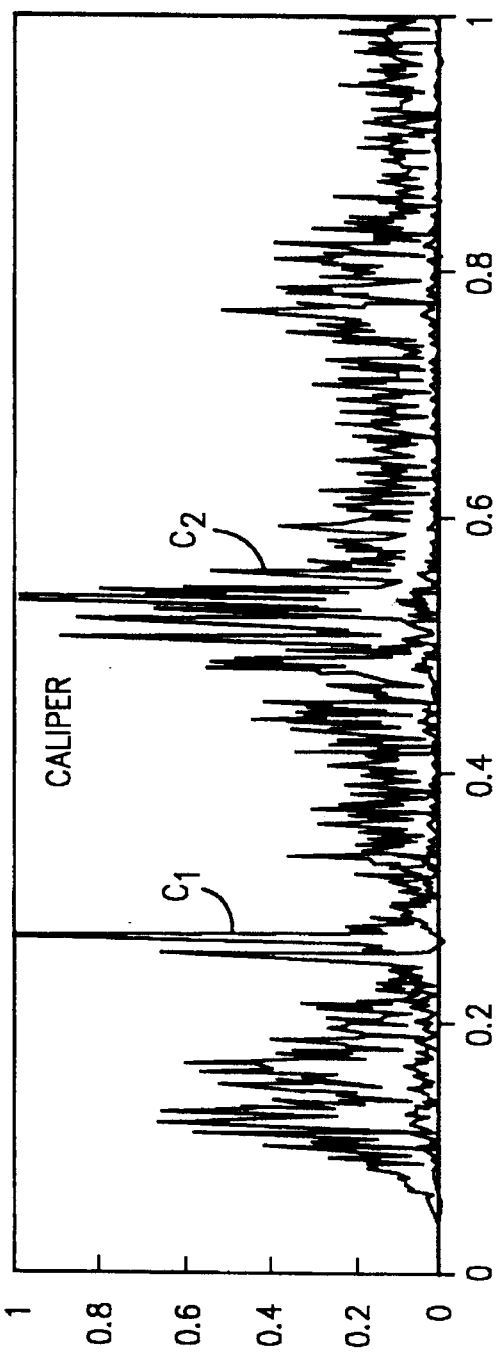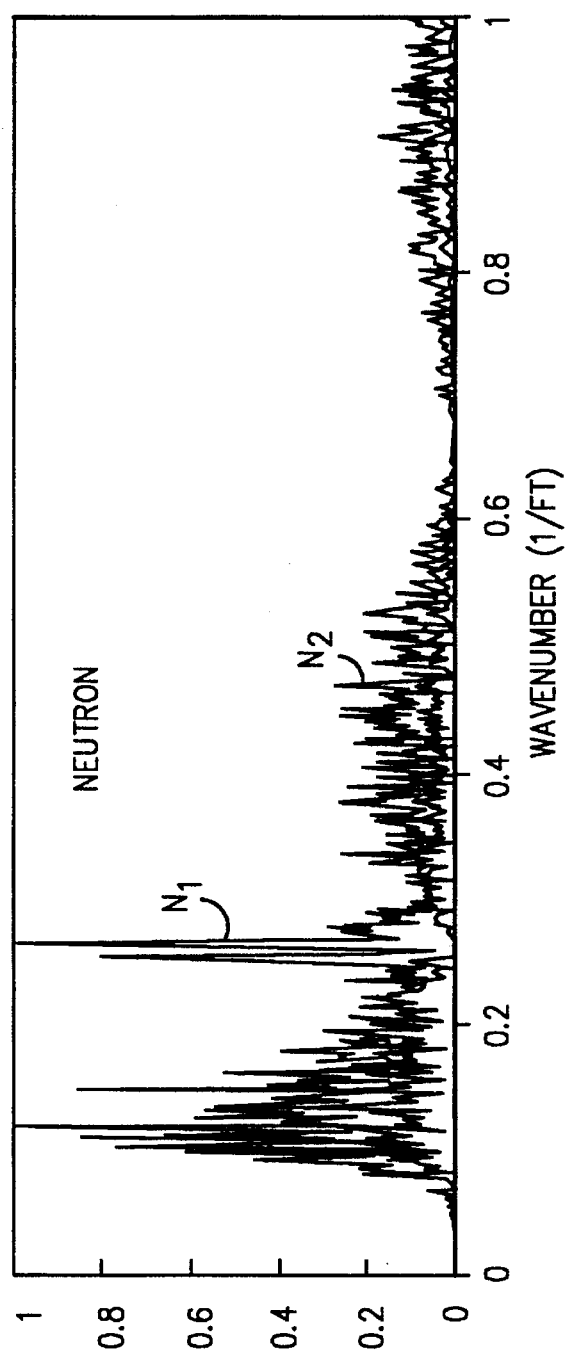
FIG. 2A
FIG. 2B

METHOD FOR REMOVING BOREHOLE RUGOSITY NOISE FROM WELL LOG DATA

BACKGROUND OF THE INVENTION

1. Field of the Invention

The present invention pertains to noise removal from well log data and more particularly the removal of induced rugosity noise from well log data.

2. Related Prior Art

Under certain drilling conditions, often in an oil based mud environment, a distinctive "sinusoidal" borehole rugosity is observed on the wireline caliper log. This borehole rugosity can have an adverse effect on the response of logging devices which require borehole contact with the tool. Among such devices are the primary porosity and lithology identification tools, density and neutron logging tools.

SUMMARY OF THE INVENTION

The method of the present invention eliminates sinusoidal noise without affecting the response of the formation. This means that the actual formation responses of the logging tools are recovered, and the logs can be used quantitatively.

Under certain conditions, borehole rugosity can adversely affect the response of wireline logging tools. The present invention discloses a robust, fast and easy to use processing module which removes "sinusoidal" noise while preserving quantitative data integrity.

Removal of sinusoidal noise from a log is accomplished in three steps. First, the log is reduced to a zero-mean, stationary series. Second, the wavenumber of the sinusoidal noise is identified by its peak in the Fourier amplitude spectrum. And third, the noise is removed by applying a zero-phase notch filter.

In order to preserve the quantitative data integrity, the low wavenumber trend must be kept. For purposes of this discussion, the wavenumber is the reciprocal of wavelength. Preserving the quantitative data integrity is accomplished by approximating the log with a least-squares cubic spline which retains the overall log character, ignoring the sinusoidal noise. A zero mean stationary series is formed by subtracting the least-squares cubic spline from the data. The remaining steps, namely, spectral or Fourier analysis and filtering, are performed on the difference series. Recombining the filtered series with the spline restores the log data without the sinusoidal noise. An advantage of this procedure is that the results are independent of the depth interval used to perform the analysis.

BRIEF DESCRIPTION OF THE DRAWINGS

FIG. 2A is a graphical representation of caliper spectra before and after filtering.

FIG. 2B is a graphical representation of neutron spectra before and after filtering.

DESCRIPTION OF THE PREFERRED EMBODIMENT

Figure 1B:
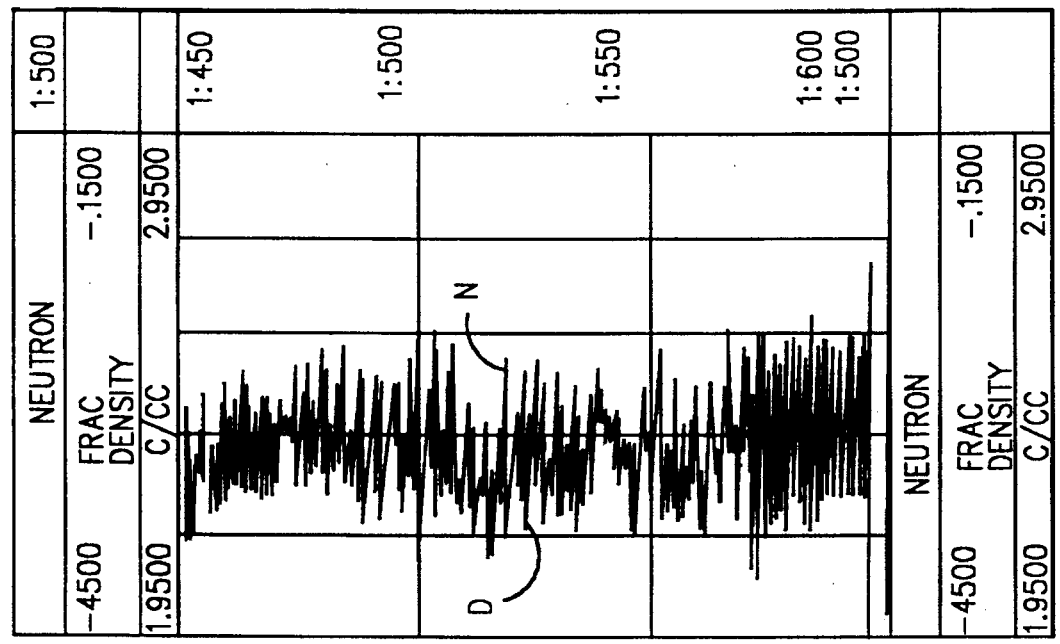
FIG. 1B is a graphical representation of a density log vs. depth and a neutron log vs. depth.
Figure 1A:
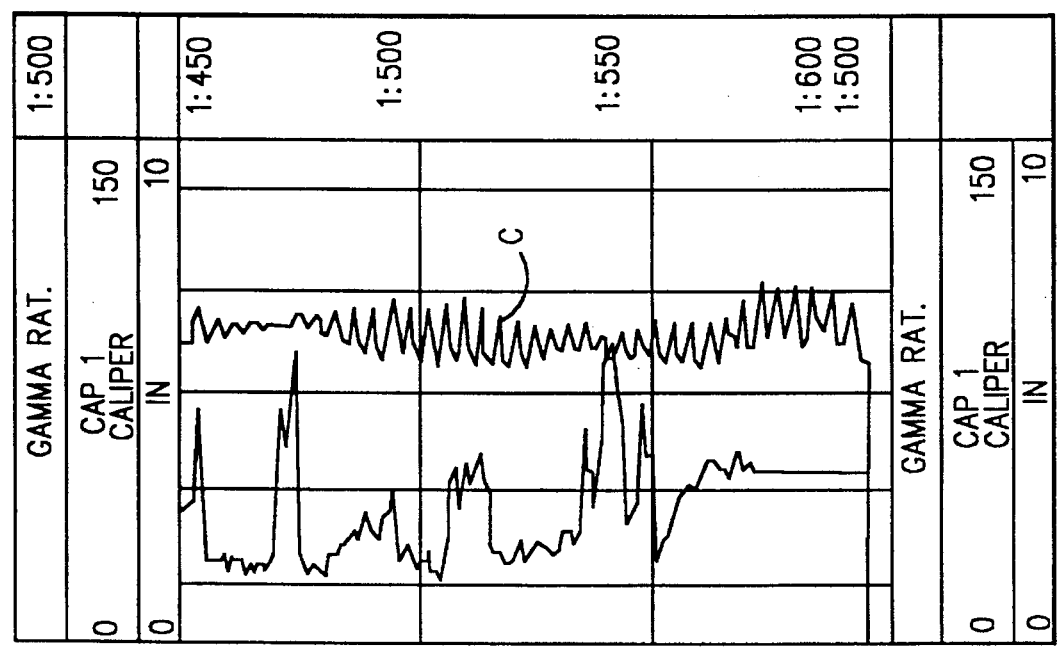
FIG. 1A is a graphical representation of a caliper log vs. depth and a gamma ray log vs. depth.

The procedure of the present invention is illustrated in FIGS. 1A–2B and 4A–4B. FIGS. 1A and 1B show the raw log as recorded with associated borehole "noise". Under drilling conditions, as stated previously, often in an oil based mud environment, a distinctive "sinusoidal" borehole rugosity can be observed on the wireline caliper log identified as C in FIG. 1A. This borehole rugosity can have an adverse effect on the response of logging devices which rely upon tool to borehole contact. Among such devices are primary porosity and lithology identification tools, such as density and neutron logging tools. FIG. 1B shows clearly the degradation of the response of these devices. This degradation renders the log of the density tool, identified as D and the log of the neutron logging tool, identified as N, both shown in FIG. 1B, of qualitative use only.

FIGS. 2A and 2B illustrate the result of the Fourier analysis (amplitude spectrum) of the difference series on the wireline caliper and neutron logs. Note that the major peak for both devices occurs at the normalized wavenumber 0.26.

Figure 3A:
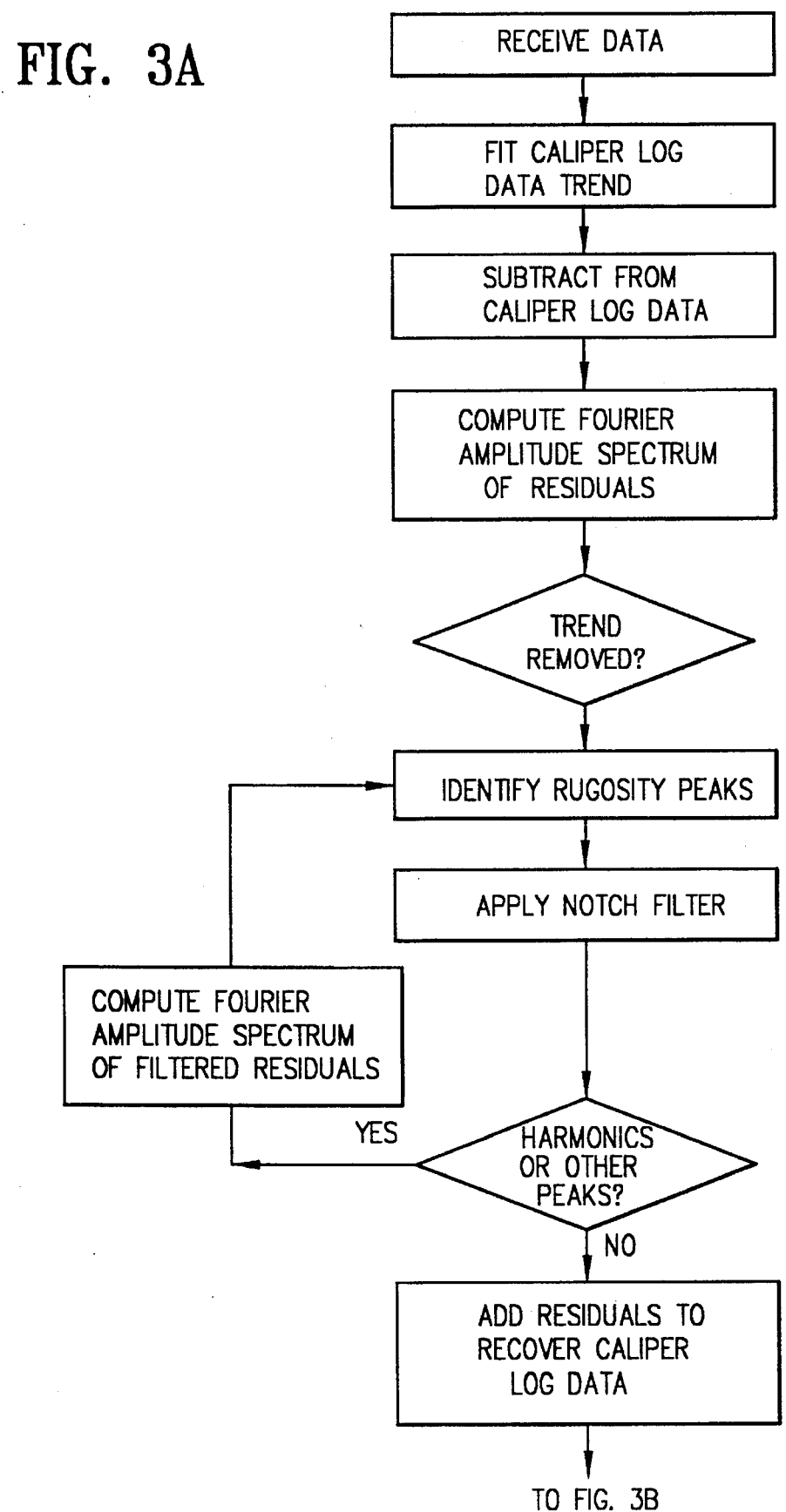
FIG. 3 is a flow chart illustrating a method for removing borehole rugosity noise from well log data.
Figure 3B:
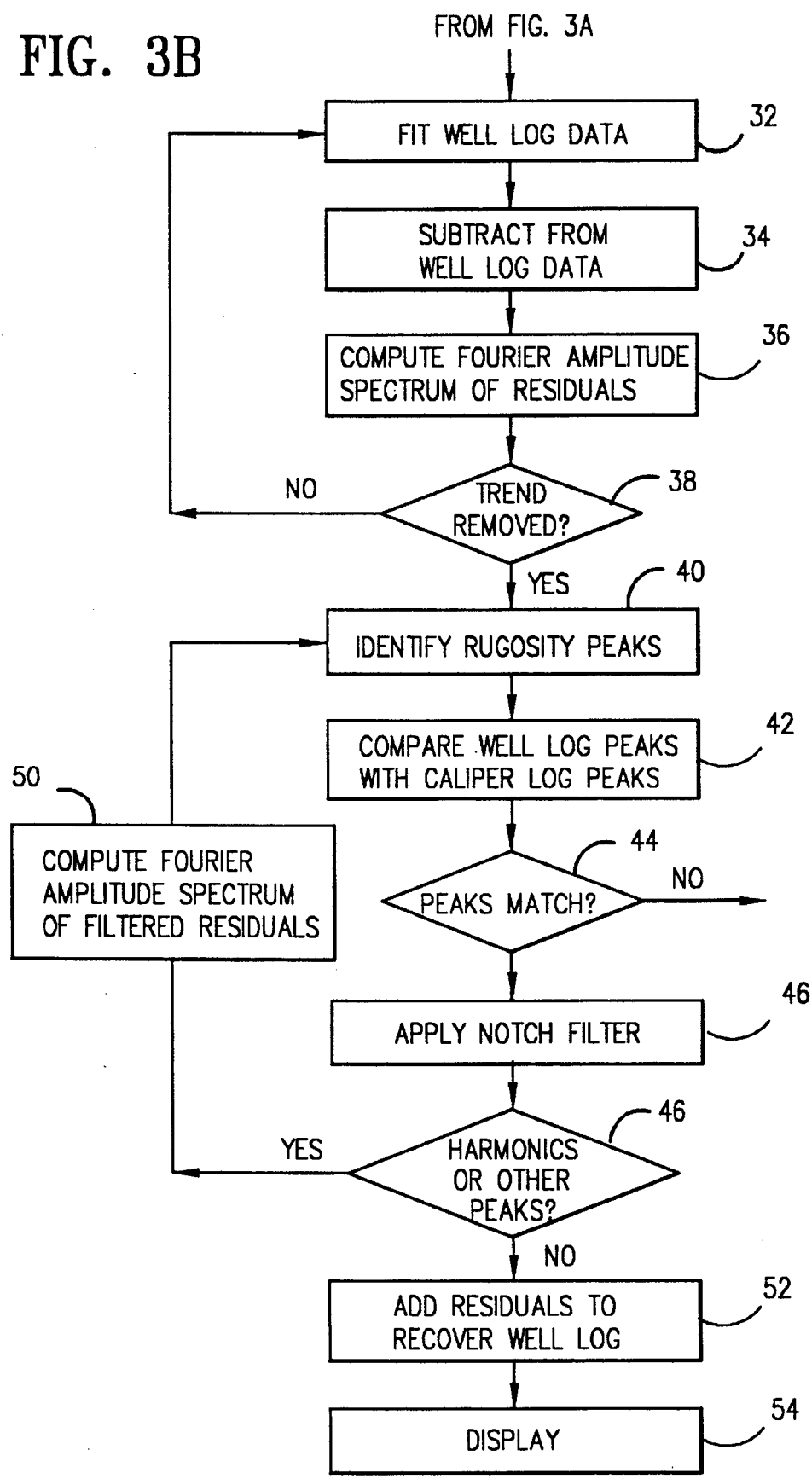

Subsequent application of a notch filter to this series does not affect the low wavenumber information in the well log data. The curves in FIGS. 2A and 2B show the spectra of the notch filtered logs. Curve C1 illustrates the caliper log before filtering and C2 illustrates the caliper log after filtering. Similarly, curve N1 illustrates the neutron log before filtering and N2 illustrates the neutron log after filtering. The peak caused by the borehole rugosity has been eliminated. Occasionally, harmonic noise peaks will be present at multiples of the sinusoidal noise wavenumber (see caliper). These peaks can be eliminated in a similar manner. Referring now to FIG. 3, in this embodiment, it is assumed that high frequency sinusoidal noise has been detected on the caliper log. At block 12 data is received. This data takes the form of a caliper log and another concomitant well log, such as a gamma ray log as described in the preferred embodiment.

At block 14, to remove sinusoidal borehole rugosity noise from a well log without corrupting low wavenumber trend information, the wavenumbers corresponding to the sinusoidal noise must be identified in the caliper log. This is accomplished by reducing the caliper log to a zero mean stationary series which contains the borehole rugosity noise.

To reduce the caliper log to a zero mean stationary series, the background trend in the caliper log is approximated with a piece wise cubic spline, in the least squares sense. The spline nodes are chosen so that the cubic spline retains the trend information from the caliper log, but not the sinusoidal noise which has a large wavenumber. If the interval between spline nodes exceeds the reciprocal of twice the sinusoidal wavenumber, then the cubic spline will not contain the sinusoidal noise. The distance between nodes cannot be so large, however, that the cubic spline fails to accurately represent the low wavenumber components of the caliper log.

Standard methods for reducing the data to a zero mean series, such as removing the mean, will not preserve the low wavenumber information.

At block 16, a zero mean stationary series is formed by subtracting the least-squares cubic spline from the caliper log. This residual difference series contains only the high frequency information from the caliper log, including the sinusoidal noise.

At block 18, the Fourier amplitude spectrum of the residual series from block 14 is computed. Sinusoidal borehole rugosity noise appears as peaks in this spectrum. Trend information resides in the low wavenumber components of the amplitude spectrum. If the background trend has been properly removed from the residual series, the Fourier amplitude spectrum will be zero in an interval about the zero wavenumber.

At block 20 the amplitude spectrum of the residual series can be used to check the adequacy of the choice for spline nodes. The amplitude spectrum of the residuals should contain no low wavenumber components, but it should have a large peak, and possibly harmonic peaks, indicating the presence of sinusoidal noise. If the spline node interval is too fine, the sinusoidal noise will be included in the cubic spline and the peak that corresponds to the sinusoidal noise will be absent from the residual amplitude spectrum. In the limit, when the spline node interval equals the sample interval for the well log data, the cubic spline will exactly coincide with the well log data and the residual amplitude spectrum will be identically zero with no peaks.

If the spline interval is too coarse, the residual amplitude spectrum will contain DC or low wavenumber components. These wavenumber components can be affected by the notch filter that is used to remove the sinusoidal noise. Consequently, combining the residual series with the cubic spline will corrupt low wavenumber trend information in the well log.

If the amplitude spectrum indicates that trend information remains in the residual series, then the interval between spline nodes must be reduced and the procedure in blocks 14–18 must be repeated. If the amplitude spectrum of the residual series shows that the trend information is removed, then the algorithm proceeds to block 22.

At block 22 peaks that correspond to sinusoidal borehole rugosity noise are identified in the amplitude spectrum of the residuals, and their wavenumbers are saved for later use.

At block 24 a notch filter is applied to the residual series to remove the sinusoidal noise. A recursive (IIR) filter was used as a notch filter in tests of this method. In the preferred embodiment the filter is given by:

$$y_n = x_n - 2 \cos(\pi k_0) x_{n-1} + x_{n-2} + 2\alpha \cos(\pi k_0) y_{n-1} - \alpha^2 y_{n-2}$$

where $k_0$ is the wavenumber to be eliminated, and $\alpha$ is a design parameter that determines the location of the poles of the filter transfer function. Satisfactory results were obtained with $\alpha$ equal to 0.8–0.9. The time reverse of thus filter was applied to achieve a zero phase filter response. It is understood that other types of notch filters can be applied.

The notch filter is designed to remove wavenumber components of the amplitude spectrum that were identified as sinusoidal borehole rugosity noise. Note that since the residual series contains no low wavenumber components, the low wavenumber trend information in the caliper log cannot be affected by this procedure. Thus all trend information is preserved in the caliper log data.

At block 26 the presence of harmonics or other peaks is determined. Occasionally, after application of the filter, harmonic noise peaks will be present at multiples of the sinusoidal noise wavenumber. These peaks can be eliminated in a similar manner.

If harmonics or other peaks remain in the amplitude spectrum of the residual series, the amplitude spectrum of the filtered residual series is computed in block 28 and the procedure outlined in blocks 22 and 24 are repeated. Otherwise, the process proceeds to block 30.

At block 30 the residual series is added to the least-squares spline determined from blocks 14–20. This restores the caliper log data, without the sinusoidal borehole rugosity noise.

Having determined the wavenumber and its harmonics associated with the sinusoidal noise from the caliper log, the steps above are repeated on other logs which are known to be potentially affected by borehole rugosity. The period of the rugosity dictates which logging tool responses are affected. This procedure has an important log quality control application. The spectrum of the caliper log can be used to verify that peaks in the spectra of other logs are caused by borehole rugosity.

If the wavenumber or wavenumbers obtained from the caliper log are in agreement with the ones obtained from the other log, the sinusoidal noise present in the log is indeed due to borehole rugosity. Removal of the sinusoidal noise is then fully justified.

The process steps at blocks 32–38 are to remove the background trends from other well logs that are affected by borehole rugosity. These steps duplicate the procedure of blocks 14–20 that was used to remove the background trend from the caliper log. However, these steps produce zero mean stationary residual series for each well log. Any borehole rugosity noises that are present in the well logs are also contained in the residual series.

At block 32, to remove sinusoidal borehole rugosity noise from a well log without corrupting low wavenumber trend information, the wavenumbers corresponding to the sinusoidal noise must be identified in the well log. This is accomplished by reducing the well log to a zero mean stationary series which contains the borehole rugosity noise.

To reduce the well log to a zero mean stationary series, the background trend in the well log is approximated with a piece wise cubic spline, in the least squares sense. The spline nodes are chosen so that the cubic spline retains the trend information from the well log, but not the sinusoidal noise which has a large wavenumber. If the interval between spline nodes exceeds the reciprocal of twice the sinusoidal wavenumber, then the cubic spline will not contain the sinusoidal noise. The distance between nodes cannot be so large, however, that the cubic spline fails to accurately represent the low wavenumber components of the well log.

Standard methods for reducing the data to a zero mean series, such as removing the mean, will not preserve the low wavenumber information.

At block 34, a zero mean stationary series is formed by subtracting the least-squares cubic spline from the well log. This residual difference series contains only the high frequency information from the well log, including the sinusoidal noise.

At block 36, the Fourier amplitude spectrum of the residual series from block 32 is computed. Sinusoidal borehole rugosity noise appears as peaks in this spectrum. Trend information resides in the low wavenumber components of the amplitude spectrum. If the background trend has been properly removed from the residual series, the Fourier amplitude spectrum will be zero in an interval about the zero wavenumber.

At block 38 the amplitude spectrum of the residual series can be used to check the adequacy of the choice for spline nodes. As in the case with the caliper log data, the amplitude spectrum of the residuals from the well log data should contain no low wavenumber components, but it should have a large peak, and possibly harmonic peaks, indicating the presence of sinusoidal noise. If the spline node interval is too fine, the sinusoidal noise will be included in the cubic spline and the peak that corresponds to the sinusoidal noise will be absent from the residual amplitude spectrum. In the limit, when the spline node interval equals the sample interval for the well log data, the cubic spline will exactly coincide with the well log data and the residual amplitude spectrum will be identically zero with no peaks.

If the spline interval is too coarse, the residual amplitude spectrum will contain DC or low wavenumber components. These wavenumber components can be affected by the notch filter that is used to remove the sinusoidal noise. Consequently, combining the residual series with the cubic spline will corrupt low wavenumber trend information in the well log.

If the amplitude spectrum indicates that trend information remains in the residual series, then the interval between spline nodes must be reduced and the procedure in blocks 32–36 must be repeated. If the amplitude spectrum of the residual series shows that the trend information is removed, then the algorithm proceeds to block 40.

At block 40 a potential borehole rugosity peak is identified in the amplitude spectrum of the well log residual series.

At block 42 the potential borehole rugosity peak is compared to the borehole rugosity peaks identified with the caliper log.

At block 44, the result of the comparison of block 42 is evaluated. If there is a match, indicating that the peak is caused by a borehole rugosity, the process proceeds to block 46 where a notch filter is used to remove the noise. Otherwise, the process proceeds to Block 48.

At block 48 a determination is made whether there are other peaks or harmonics in the amplitude spectrum of the well log residuals. If there are, the amplitude spectrum of the filtered residuals is computed at block 50, and the process of blocks 40–46 are repeated. Otherwise, the process continues to block 52.

At block 52, the restored well log is obtained by combining the least squares cubic spline with the filtered residual series. Elimination of the sinusoidal noise means that the actual formation responses of the logging tools are recovered, and the logs can now be used quantitatively. Elimination of the sinusoidal noise exposes the underlying signal in the well log data without corrupting the low wavenumber trend.

Finally, at block 54, the results from blocks 30 and 52 may be displayed. This may be by any means currently in use in the art, such as a cathode ray tube, graphical printout etc.

Figure 4B:
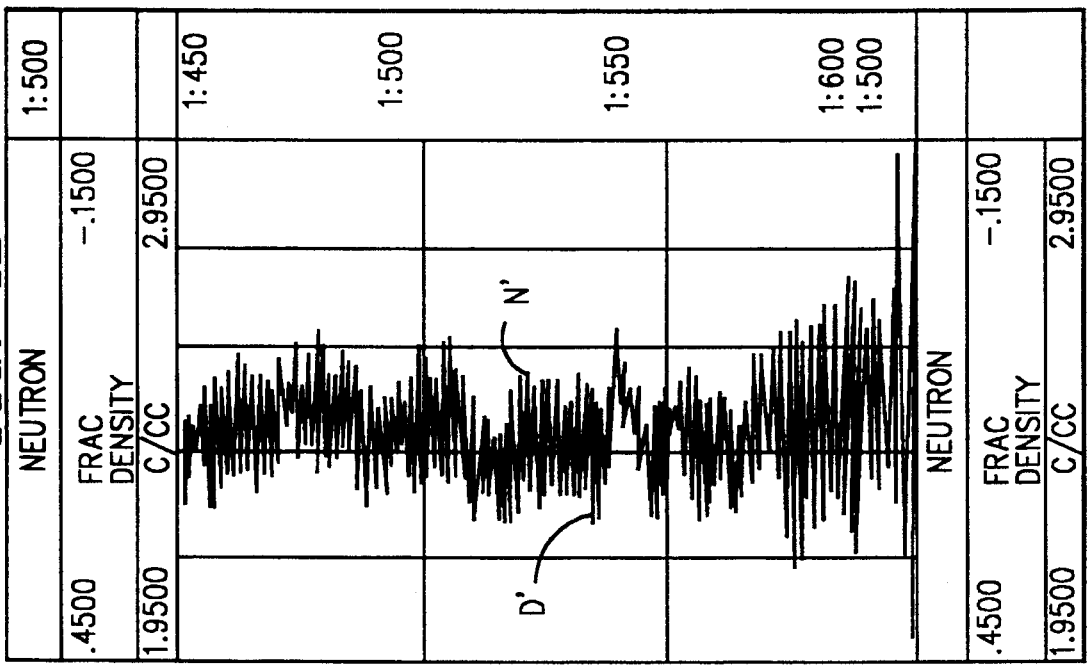
FIG. 4B is a graphical representation of the log of FIG. 1B after filtering.
Figure 4A:
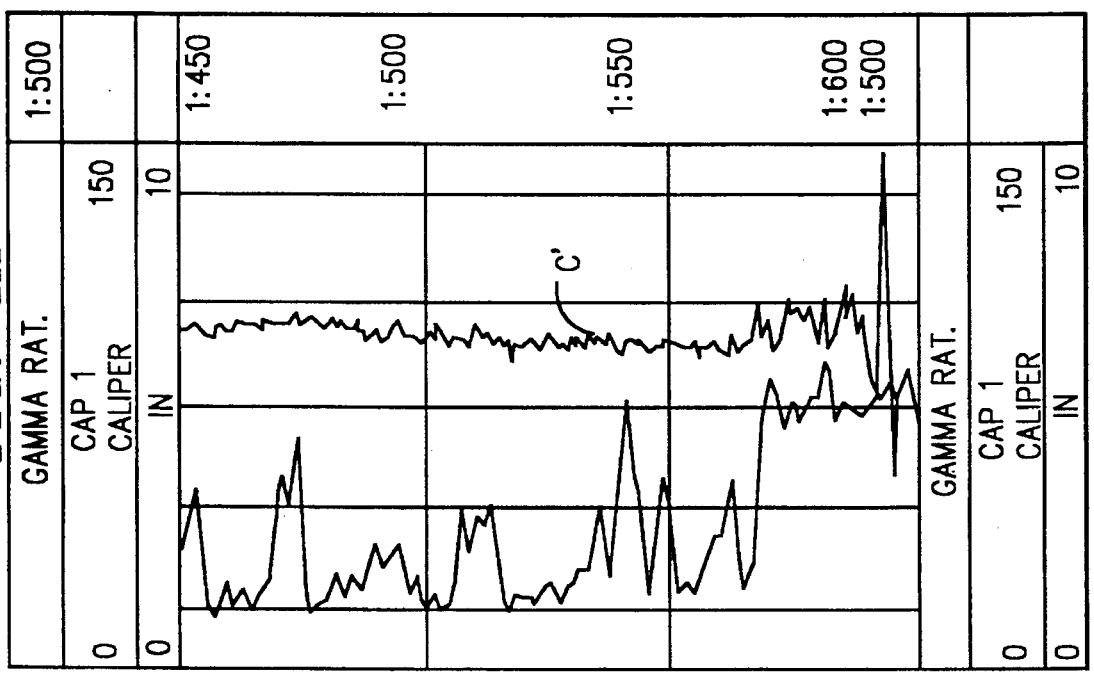
FIG. 4A is a graphical representation of the log of FIG. 1A after filtering.

FIGS. 4A and 4B show the restored well log obtained by combining the least squares cubic spline with the filtered difference series. Caliper log C is designated by C' after the process of the present invention has been performed. Neutron log N is designated by N' and density log D by D' after the process of the present invention has been performed. Elimination of the sinusoidal noise means that the actual formation response of the logging tools is recovered, and the logs can now be used quantitatively. As expected, the period of the rugosity dictates which logging tool responses are affected. This procedure has an important log quality control application. This application is that the spectrum of the caliper log can be used to verify that peaks in the spectra of other logs are caused by borehole rugosity.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

We claim:

1. A method for removal of sinusoidal noise from a log comprising the steps of:

receiving caliper log data and well log data having sinusoidal noise;

reducing said caliper log data to a zero-mean, stationary series by approximating the background trend in said caliper log data with a piece wise cubic spline and subtracting said piece wise cubic spline from said caliper log data;

identifying the wavenumber of said sinusoidal noise in said caliper log data by its peak in a Fourier amplitude spectrum of residuals after said reducing step; and removing said sinusoidal noise from said caliper log data by applying a filter.

2. The method according to claim 1 wherein said step of identifying the wavenumber of said sinusoidal noise in said caliper log data includes the steps of:

computing the Fourier amplitude spectrum of a residual series in said caliper log data from said reducing step;

determining wavenumber components of said amplitude spectrum; and correlating peaks in said amplitude spectrum to borehole rugosity noise.

3. The method according to claim 1 wherein said step of removing sinusoidal noise from said caliper log data includes the step of:

applying a notch filter to said caliper log data.

4. The method according to claim 3 wherein said step of applying a notch filter to said caliper log data includes the step of:

using a zero-phase notch filter given by:

$$y_n = x_n - 2\cos(\pi k_0)x_{n-1} + x_{n-2} + 2\alpha\cos(\pi k_0)y_{n-1} - \alpha^2 y_{n-2}$$

where $k_0$ is the wavenumber to be eliminated, and $\alpha$ is a design parameter that determines the location of the poles of the filter transfer function.

5. The method according to claim 1 also including the steps of:

reducing said well log data to a zero-mean, stationary series;

identifying the wavenumber of said sinusoidal noise in said well log data by its peak in the Fourier amplitude spectrum;

comparing said peak of said sinusoidal noise in said well log data with said peak of said sinusoidal noise in said caliper log data; and removing said sinusoidal noise from said well log data by applying a filter.

6. The method according to claim 5 wherein said step of reducing said well log data step also includes the steps of:

approximating the background trend in said well log data with a piece wise cubic spline; and subtracting said piece wise cubic spline from said well log data.

7. The method according to claim 5 wherein said step of identifying the wavenumber of said sinusoidal noise in said well log data includes the steps of:

computing the Fourier amplitude spectrum of a residual series in said well log data from said reducing step;

determining wavenumber components of said amplitude spectrum; and correlating peaks in said amplitude spectrum to borehole rugosity noise.

8. The method according to claim 5 wherein said step of comparing includes the step of:

determining whether said peaks in said well log data correspond to said peaks in said caliper log data.

9. The method according to claim 5 wherein said step of removing sinusoidal noise from said well log data includes the step of:

applying a notch filter to said well log data.

10. The method according to claim 9 wherein said step of applying a notch filter to said caliper log data includes the step of:

using a zero-phase notch filter given by:

$$y_n = x_n - 2\cos(\pi k_0)x_{n-1} + x_{n-2} + 2\alpha\cos(\pi k_0)y_{n-1} - \alpha^2 y_{n-2}$$

where $k_0$ is the wavenumber to be eliminated, and $\alpha$ is a design parameter that determines the location of the poles of the filter transfer function.

11. A method for removal of sinusoidal noise from a log comprising the steps of:

receiving caliper log data and well log data having sinusoidal noise;

reducing said caliper log data to a zero-mean, stationary series by approximating the background trend in said caliper log data with a piece wise cubic spline and substracting said piece wise cubic spline from said caliper log data;

identifying the wavenumber of said sinusoidal noise by its peak in a Fourier amplitude spectrum of residuals after said reducing step;

removing said sinusoidal noise from said caliper log data by applying a notch filter;

reducing said well log data to a zero-mean, stationary series by approximating the background trend in said well log data with a piece wise cubic spline and substracting said piece wise cubic spline from said well log data;

identifying the wavenumber of said sinusoidal noise in said well log data by its peak in the Fourier amplitude spectrum;

comparing said peak of said sinusoidal noise in said well log data with said peak of said sinusoidal noise in said caliper log data; and removing said sinusoidal noise from said well log data by applying a notch filter.

12. The method according to claim 11 wherein said step of identifying the wavenumber of said sinusoidal noise in said caliper log data includes the steps of:

computing the Fourier amplitude spectrum of a residual series in said caliper log data from said reducing step;

determining wavenumber components of said amplitude spectrum; and correlating peaks in said amplitude spectrum to borehole rugosity noise.

13. The method according to claim 11 wherein said step of removing sinusoidal noise from said caliper log data by applying a notch filter includes the step of:

applying a zero-phase notch filter given by:

$$y_n = x_n - 2\cos(\pi k_0)x_{n-1} + x_{n-2} + 2\alpha(\pi k_0)y_{n-1} - \alpha^2 y_{n-2}$$

where $k_0$ is the wavenumber to be eliminated, and $\alpha$ is a design parameter that determines the location of the poles of the filter transfer function.

14. The method according to claim 11 wherein said step of identifying the wavenumber of said sinusoidal noise in said well log data includes the steps of:

computing the Fourier amplitude spectrum of a residual series in said well log data from said reducing step;

determining wavenumber components of said amplitude spectrum; and correlating peaks in said amplitude spectrum to borehole rugosity noise.

15. The method according to claim 11 wherein said step of comparing includes the step of:

determining whether said peaks in said well log data correspond to said peaks in said caliper log data.

16. The method according to claim 11 wherein said step of removing sinusoidal noise from said well log data by applying a notch filter includes the step of:

applying a zero-phase notch filter given by:

$$y_n = x_n - 2\cos(\pi k_0)x_{n-1} + x_{n-2} + 2\alpha\cos(\pi k_0)y_{n-1} - \alpha^2 y_{n-2}$$

where $k_0$ is the wavenumber to be eliminated, and $\alpha$ is a design parameter that determines the location of the poles of the filter transfer function.

17. A method for removal of sinusoidal noise from a log comprising the steps of:

receiving caliper log data and well log data having sinusoidal noise;

reducing said caliper log data to a zero-mean, stationary series by approximating the background trend in said caliper log data with a piece wise cubic spline and substracting said piece wise cubic spline from said caliper log data;

identifying the wavenumber of said sinusoidal noise by its peak in a Fourier amplitude spectrum of residuals after said reducing step by computing the Fourier amplitude spectrum of a residual series in said caliper log data from said reducing step, determining wavenumber components of said amplitude spectrum and correlating peaks in said amplitude spectrum to borehole rugosity noise;

removing said sinusoidal noise from said caliper log data by applying a notch filter given by:

$$y_n = x_n - 2\cos(\pi k_0)x_{n-1} + x_{n-2} + 2\alpha\cos(\pi k_0)y_{n-1} - \alpha^2 y_{n-2}$$

where $k_0$ is the wavenumber to be eliminated, and $\alpha$ is a design parameter that determines the location of the poles of the filter transfer function;

reducing said well log data to a zero-mean, stationary series by approximating the background trend in said well log data with a piece wise cubic spline and substracting said piece wise cubic spline from said well log data;

identifying the wavenumber of said sinusoidal noise in said well log data by its peak in the Fourier amplitude spectrum by computing the Fourier amplitude spectrum of a residual series in said well log data from said reducing step, determining wavenumber components of said amplitude spectrum and correlating peaks in said amplitude spectrum to borehole rugosity noise;

comparing said peak of said sinusoidal noise in said well log data with said peak of said sinusoidal noise in said caliper log data by determining whether said peaks in said well log data correspond to said peaks in said caliper log data; and removing said sinusoidal noise from said well log data by applying a notch filter given by:

$$y_n = x_n - 2\cos(\pi k_0)x_{n-1} + x_{n-2} + 2\alpha \cos(\pi k_0)y_{n-1} - \alpha^2 y_{n-2}$$

where $k_0$ is the wavenumber to be eliminated, and $\alpha$ is a design parameter that determines the location of the poles of the filter transfer function.

* * * * *